United States Patent [19]

Booth et al.

[11] 4,225,432

[45] Sep. 30, 1980

[54] EFFICIENCY OF ULTRAFILTRATION PURIFICATION OF SOLUTIONS OF POLYMERIC COLORANTS BY INORGANIC BASE ADDITION

[75] Inventors: Robin G. Booth, Palo Alto; Anthony R. Cooper, Los Altos, both of Calif.

[73] Assignee: Dynapol, Palo Alto, Calif.

[21] Appl. No.: 743,207

[22] Filed: Nov. 18, 1976

[51] Int. Cl.$^3$ .................. B01D 31/00; C02F 1/44; C09B 67/00

[52] U.S. Cl. .................. 260/144; 252/447; 210/639; 260/152; 260/157; 260/208; 260/556 A; 260/561 N; 260/583 H; 260/583 P; 260/704; 546/76

[58] Field of Search .............. 210/321, 433 M, 23 F; 260/144, 208, 278, 377, 691, 704, 159, 152; 546/76

[56] References Cited

U.S. PATENT DOCUMENTS

| | | | |
|---|---|---|---|
| 2,065,928 | 12/1936 | Waldron | 260/208 UX |
| 2,124,590 | 7/1938 | Reed | 260/208 X |
| 2,611,771 | 9/1952 | Marnon | 260/314.5 |
| 3,526,588 | 9/1970 | Michaels et al. | 210/23 |
| 3,679,661 | 7/1972 | Babson | 260/233.3 R |
| 3,920,855 | 11/1975 | Dawson et al. | 260/144 X |
| 4,088,572 | 5/1978 | Cooper et al. | 210/23 F |

OTHER PUBLICATIONS

Perry, "Progress in Separation and Purification", vol. 1, pp. 297 to 334 (1968).
Weissberger (II), Technique of Organic Chemistry., vol. III, pp. 558 to 563, 565 (1950).

*Primary Examiner*—Floyd D. Higel
*Attorney, Agent, or Firm*—William H. Benz

[57] ABSTRACT

The ultrafiltration purification of aqueous solutions of polymeric colorants, wherein low molecular weight impurities are removed in an ultrafiltrate leaving a purified polymeric colorant-bearing retentate, is carried out with improved efficiency when during at least 2 diavolumes of ultrafiltration, the pH of the retentate is maintained above about pH 9.0.

18 Claims, No Drawings

EFFICIENCY OF ULTRAFILTRATION PURIFICATION OF SOLUTIONS OF POLYMERIC COLORANTS BY INORGANIC BASE ADDITION

BACKGROUND OF THE INVENTION

This invention relates to an improvement in an ultrafiltration process for purifying solutions of polymeric colorants.

U.S. Pat. No. 3,920,855 of Dawson et al issued Nov. 18, 1975 and copending patent application, Ser. No. 520,530 filed Nov. 4, 1974 by Gless et al U.S. Patent 4,018,826, issued on April 19, 1977 and Ser. No. 638,730 filed Dec. 8, 1975 by Wingard et al and now U.S. Pat. No. 4,051,138 and Japanese patent applications of Tanabe Seiyaku such as 41-14433, 41-14434 and 44-13382 disclose that colors can offer advantages in polymeric form. U.S. patent application Ser. No. 727,097 filed on Sept. 27, 1976 by Ned Weinshenker, and now abandoned, further discloses that ultrafiltration is useful to purify polymeric colorants and free these colorants from undesired monomeric and low molecular weight polymeric impurities. The present invention concerns a way to improve the efficiency of this purification.

STATEMENT OF THE INVENTION

It has now been found that ultrafiltration purification of polymeric colorant solutions proceeds with improved efficiency when base is added to the solution in an amount sufficient to maintain the solution pH above pH 9.0. More particularly, it has been found that when an aqueous feed solution made up of polymeric colorant of molecular weight above 1000 Daltons, and polymeric colorant, colorant precursors, colorant degradation products, salts and the like impurities of molecular weight below 1000 is contacted with a semipermeable membrane under ultrafiltration conditions in a diafiltration mode for a plurality of diavolumes thus causing separation of the feed solution into an ultrafiltrate enriched in impurities and a retentate enriched in polymeric colorant of molecular weight above 1000 Daltons the desired separation occurs with improved efficiency when during at least two diavolumes, the pH of the feed is maintained above pH 9 by the addition of base.

DETAILED DESCRIPTION OF THE INVENTION

In accord with the present invention, ultrafiltration purification of polymeric dye solutions especially, the solutions which occur during the preparation of polymeric dyes, proceeds with improved efficiency when base is added to and maintained in the solution during at least a portion of the ultrafiltration.

The solutions to which the present invention relates called "feed solutions" are aqueous solutions. That is, they have a predominantly (greater than 50% w) water solvent. The solvent is from 50 to 100% water with the remainder comprising organics such as alcohols, glycols, ethers, liquid organic amines such as pyridine, and the like. Water and water containing from 0 to 35% pyridine are preferred solvents.

The feed solutions contain from 0.1 to 10% w (basis total solution) of polymeric colorant of molecular weight above 1000 Daltons. These colorants are composed of a plurality of units of chromophore covalently linked to or into a polymeric backbone. A number of typical polymeric colorants are illustrated in the examples. Preference is given to polymeric azo and anthraquinone colorants. Preferably, the feed solutions contain from 0.2 to 9% w of polymeric colorants of molecular weight above 1000 Daltons with amounts in the range of 0.5 to 8% w being most preferred.

The feed solutions used with the present invention most commonly are the crude or partially purified reaction products of the polymeric colorant preparation. As such they contain polymeric dye precursors as impurities as well as low (less than 1000 Dalton) molecular weight polymeric colorants. They generally additionally contain salts, usually inorganic salts of neutralization formed during the polymeric colorant preparation. Also, these solutions can contain degradation products which form during polymeric colorant preparation and byproducts. These organic impurities have the property of being of molecular weight below 1000 Daltons. They are present in the feed solution at a concentration of from 0.04 to 10% w (basis solution) which is from 3 to about 1 to 100% w (basis polymeric colorant). Preferably the organic impurities are present in an amount of from 1 to 75% w (basis colorant) and more preferably are present in amounts of from 1 to 65% w (basis colorant). Inorganic salt impurities can range from 10 to 400% wt, basis colorant; with levels from 20 to 200% being preferred and levels from 30 to 150% being more preferred. It is of especial interest to remove the organic impurities (and in many cases the inorganic impurities) as completely as possible when the finished product is to be used as a non-absorbable colorant for edibles since, as a rule, materials of molecular weight below about 1000 Daltons are absorbable from the gastrointestinal tract into the body and materials above this weight are not absorbable. Final organic impurity levels of less than 5000 ppm (basis colorant) are preferred.

In the ultrafiltration process to which the present invention relates, the feed solution is contacted with a semipermeable membrane. This contacting is effected under "ultrafiltration conditions" which conditions are defined to include a positive upstream pressure of from 25 to 200 psig, preferably 50 to 150 psig and more preferably 75 to 125 psig; a temperature of 10° to 100° C., preferably 15° to 90° C. and more preferably 25° to 80° C.

The semipermeable membranes employed in the ultrafiltration are asymmetric semipermeable membranes, preferably anisotropic asymmetric membranes. Preferably, these membranes have a lower exclusion limit of from 5000 to 100,000 Daltons. These membranes may take the form of thin channel or wide channel passages or hollow permeable fibers through which the feed solution is passed. The exact composition of these membranes is not a part of this invention. Suitable membranes may be obtained commercially from a number of sources including AMICON Corporation, CAmbridge, Mass., Romicon Corporation, ABCOR, T. J. Engineering Corporation and Union Carbide Corporation. Examples of suitable membrane materials are Amicon's anisotropic membranes sold under the designation PM-10, PM-30, and XM-50; FEG membranes Types D or M and HFA 100, 200, and 300; T. J. Engineering's, Osmonics, Inc., SEPA membranes, and Carbide's UCAR-SEP membranes.

In the ultrafiltration process to which this invention pertains, the feed solution is contacted with such membranes under "ultrafiltration conditions" as such term has been above defined. A portion of the feed solution passes through the membrane. This fraction is called "the ultrafiltrate"; the portion which does not pass is "the retentate." It is common in ultrafiltration to effect a plurality of contactings of the feed solution with the membrane. In a batch operation this may be done by refeeding or recycling the retentate. In a continuous operation this may be effected by recycle or by employing several membrane modules in series. With each contacting there is removal of solvent as ultrafiltrate. It is common to add makeup solvent to the retentate to compensate for the solvent passing as ultrafiltrate. This addition permits a uniform viscosity, polymer concentration and the like to prevail during ultrafiltration. This mode of operation, wherein makeup solvent is added, is called diafiltration. The present invention relates to this type of operation and calls for the addition of base so as to maintain a pH level when operating in a diafiltration mode.

A common method to measure the amount of ultrafiltration effected is to measure the number of diavolumes passed in a diafiltration mode. One diavolume is a volume equal to the original feed volume. That is, if an initial feed volume is one gallon and during ultrafiltration 3 gallons of ultrafiltrate is passed and 3 gallons of makeup solvent is added, leaving a final volume of one gallon, this would be equal to 3 diavolumes.

As will be apparent, if a material passes through the ultrafiltration membrane during diafiltration and is not replenished in makeup solution, its concentration will drop. Bases, when present, are of a size which passes through ultrafiltration membranes. It is the essence of the present invention to maintain above a certain level the concentration of base in the retentate resulting from the ultrafiltration purification of a polymeric dye solution during at least two diavolumes of ultrafiltration, preferably during from 3 to 20 diavolumes and more preferably during from 4 to 15 diavolumes. This can be effected either by loading the initial feed with an amount of base sufficient to maintain the required minimum base level throughout the diafiltration or, and this is generally preferred, by maintaining the base concentration by adding base with the diafiltration makeup solution. A combination of these two methods may be used as well.

The pH level which should be maintained in accord with the present invention is a pH of 9.0 or greater, preferably 10 to 13, and more preferably 11.0 to 13.0. The reasons for the advantages of this pH maintenance are not known with certainty. In a sentence, if base level is maintained, the removal of impurities into the ultrafiltrate from a polymeric colorant solution proceeds with markedly superior efficiency than if the base level is not maintained.

In theory, any base which is strong enough to impart the desired pH's to the makeup might be used. For reasons of economy, inorganic bases, i.e., the alkali metal and alkaline earth metal hydroxides and ammonium hydroxides are preferred. A more preferred class of bases are KOH, NaOH, Ca(OH)$_2$ and NH$_4$OH. These bases are added by conventional means, most commonly as concentrated solutions or by dissolving solid base in the solution. The bases can be added with the makeup solvent or separately. Usually, it is convenient to add them with the makeup solvent.

During the diafiltration with base addition the low molecular weight impurities pass out in the ultrafiltrate. When these materials have reached a satisfactorily low level, it is acceptable to perform several, i.e., 1 to 10, preferably 1 to 5, additional diavolumes of diafiltration without base addition so as to effect removal of base. Also, it is acceptable to perform additional ultrafiltration on the retentate without makeup addition so as to remove solvent and effect a concentrating of the retentate. The present invention has proven useful in the ultrafiltration purification of a wide range of polymeric colorants. These colorants can be classified as anion-solubilized, water-soluble polymeric dyes. That means that the dyes have anionic solubilizer groups, such as $SO_3^-$, $PO_3^{--}$ and/or $CO_2^-$, in their structures. These colorants have nonchromophoric backbones to which are covalently bound chromophoric groups, such as azo anthraquinone, xanthene, indigoid, and triphenylmethane chromophore groups. The solubilizer groups are attached to the backbone or to the chromophore, i.e.,

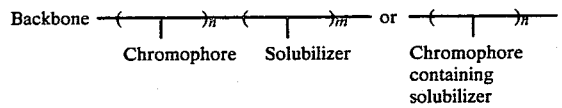

Chromophore    Solubilizer    Chromophore containing solubilizer

It is often of advantage to add and/or maintain other materials in the ultrafiltration feed along with base. Two materials in particular deserve mention.

The first is pyridine. When purifying polymeric anthraquinone colorants, adding and maintaining from about 1 to about 20% by volume of pyridine in the retentate during the period that base is being maintained can have an advantageous effect. With the anthraquinones, the use of pyridine and base is superior to using either material alone. (Pyridine addition is the subject of copending and concurrently filed U.S. Ser. No. 743,206 of Cooper et al. and now U.S. Pat. No. 4,088,572).

The second is inorganic salt, such as an alkali metal halide especially KCl or NaCl. When purifying polymeric azo colorants, the presence and maintenance of 1% or greater, i.e., 1–4% salt in the retentate, increases the removal of organic impurities. Salt also has a beneficial effect, though less marked, on polymeric anthraquinone colorant purifications. The period of salt maintenance is similar to and usually coincides with the period of base addition. (Salt addition is the subject of copending and concurrently filed U.S. Ser. No. 743,204 of Cooper et al.)

EXAMPLE I

This example illustrates the advantageous addition of base during the ultrafiltration of the yellow orange color of the formula

A. Colorant Precursor Preparation

A 5% solution in Dry DMF of polyepichlorohydrin (Hydrin ™ 100) is prepared. An amount of this solution to provide 287 g of polyepichlorohydrin is stirred at 18° C. while 922 g of solid salt,

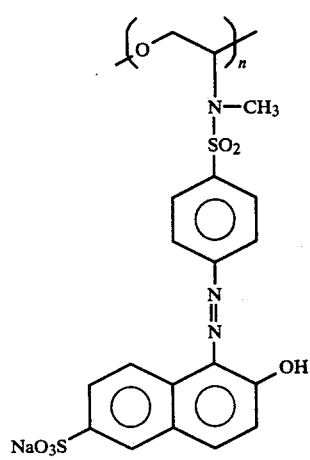

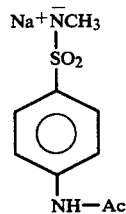

is added. The mixture is heated gradually to about 100° C. over a five hour period. The mixture is stirred overnight. The next morning the product is dumped into pH 10 water to precipitate. The very wet solid is collected and dried in a 40° C. vacuum oven to give 770 g of a polymeric colorant precursor of the formula

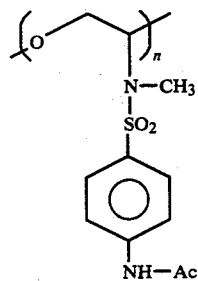

B. Colorant Production

The polymer of Part A (602 g) is dissolved in 2250 ml of concentrated hydrochloric acid at 50° C., about 1.5 liters of water is added and the mixture is refluxed for two hours to yield the polymeric amine.

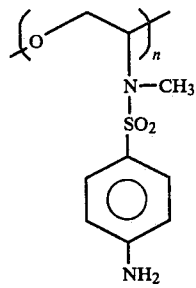

The solution is cooled to 0°–5° C. and 178 g of sodium nitrite is added in a liter of water to diazolize the amine group and yield a solution of the polymer amine. This solution is slowly run into a 38 liters solution of Schaeffers salt (628 g) of pH 10–13. Aqueous base is added along with the acidic polymer solution to maintain this pH. The resulting product is a solution of the polymeric colorant

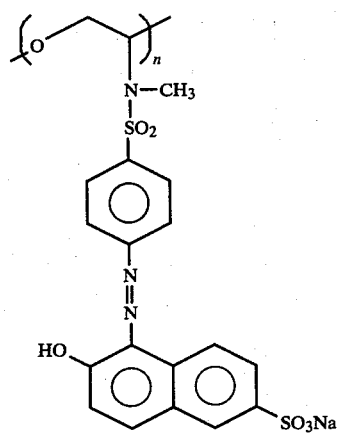

This solution (6.2 liters) containing 10.4% total solids
- about 0.5% by weight polymeric colorant of molecular weight above 1000 Daltons
- about 0.5 to 1.5% by weight of organic impurities of molecular weight below 1000 Daltons, particularly monomeric sunset yellow and Schaeffer's salt
- about 9.0% by weight of inorganic salts, basis total solution, is used as an ultrafiltration feedstock.

Ultrafiltration is carried out in a Romicon ultrafiltration unit equipped with a linear thin-channel membrane tube. The membrane chosen for use is an Amicon PM-10 anisotropic membrane having a 10,000 nominal molecular weight cutoff. The feed is circulated past the membrane at about 13 gpm with an inlet pressure of 90 psig. The temperature is slightly elevated, 30°–40° C. The feed solution is diluted to 10 liters (10 liters is defined to be one diavolume), adjusted to pH 12.4 and charged to the ultrafiltration unit. Ultrafiltration is begun in a diafiltration mode, that is adding liquid to the retentate in an amount equal to the amount of ultrafiltrate removed. During an initial 5 diavolumes of ultrafiltration, a pH 11.9 solution of NaOH is used as makeup. The ultrafiltrate is colored as low molecular weight impurities are removed into the ultrafiltrate.

After 5 diavolumes, instead of aqueous NaOH, deionized water is used as makeup. Five additional diavolumes are carried out. It is observed that the passage of color into the ultrafiltrate slows down and virtually stops by the end of this period, during which the retentate pH has dropped nearly to neutrality (i.e., below 8.5). Then 5 additional diavolumes of ultrafiltration are carried out, using pH 11, NaOH with 1.5% NaCl as makeup. Color is again observed, indicating that the ultrafiltration is now efficiently removing impurities. By the end of 5 further diavolumes, the color is no longer passing. Then additional diavolumes of ultrafiltration are carried out to remove added NaOH, and bring the solution to about pH 7. the makeup water is turned off and the retentate is concentrated. The retentate is later recovered.

Analysis of the final product shows that it is a purified polymeric colorant containing less than 1% of organic impurities of molecular weight below 1000 Daltons (basis colorant) and less than 1% of inorganic salts (basis colorant).

The ultrafiltered product can be used as is or may be evaporated to dryness. The product is useful for coloring edibles, where it exhibits substantial nonabsorption from the GI tract because of its low content of low molecular weight impurities and also for coloring fibers, paper, and the like.

EXAMPLE II

This Example illustrates the advantageous addition of base during the ultrafiltration purification of the polymeric azo colorant of the formula

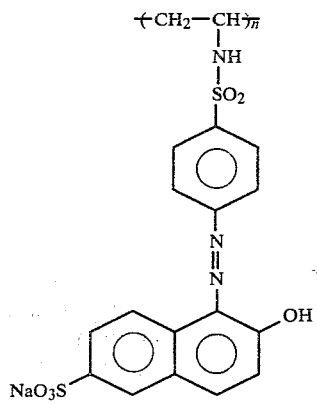

This material formed by the general method of reacting a preformed polymer, polyaminoethylene, with a chromophore precursor and converting the precursor to the chromophore. In this Example, Parts A, B, and C relate to the backbone preparation, Parts D, E, and F relate to the chromophore attachment, and Part G relates to ultrafiltration.

A. Preparation of Vinylacetamide

To 462 g of acetamide (technical) is added 12.45 ml of 6 M aqueous sulfuric acid followed immediately by 168 ml (3 moles) of acetaldehyde (99+%). This mixture is stirred and heated until the internal temperature reaches 70° C. (19 minutes). After another minute of heating, the 95° C. clear solution spontaneously crystallizes, causing a temperature rise to 106° C. The reaction product, ethylidene-bis-acetamide, is not separated. Heating and stirring are continued for another 5 minutes and a mixture of 60 g calcium carbonate (precipitated chalk) and 30 g soft glass powder is added. The resulting mixture is heated to cracking temperature and distilled at 40 mm Hg (200° C. bath temperature). When the internal temperature reaches 160° C. (0.5 hr.), the receiver is changed. After another 1.7 hr the distillation is almost over, the stirrer is stopped and the heating continued. Slow distillation continues for another hour and is then stopped. The first distillation fraction is 95.9 g of water and acetamide. The second fraction is 466 g of orange oil and crystals. NMR indicates this mixture to contain 195 g vinylacetamide (76% yield), 217 g acetamide, and 54 g ethylidene-bis-acetamide.

B. Polymerization of Vinylacetamide

A red-brown solution of 460 g of vinylacetamide, 557 g acetamide, and 123 g ethylidene-bis-acetamide, (one-half of five combined vinylacetamide preparations in accord with part A) in 570 ml methanol is filtered through 250 g of Amberlite ® IRC-50 ion exchange resin over an eight hour period. The column is rinsed with 1,000 ml methanol. The combined column eluant is stripped to its original volume of 1,667 ml, treated with 7.75 g of AIBN polymerization catalyst (1 mole %), deoxygenated, and stirred under argon at 65° C. for 15 hours to polymerize. Solid polymer is precipitated from the resulting very thick solution by addition to 15 liters of acetone. The polymer is collected by filtration, washed with acetone and dried in a vacuum oven (80° C.) for two days to afford 459 g of crude poly(vinylacetamide) contaminated with acetamide as a yellow, semi-granular solid having molecular weight of 200,000 as determined by Gel Permeation Chromatography, using dimethylformamide as eluent and polystyrene as standards.

C. Hydrolysis of Poly(vinylacetamide) to Poly(vinylamine hydrochloride)

The crude poly(vinylacetamide) obtained in part B (459 g) is dissolved in 1,000 ml water with heating. Concentrated hydrochloric acid (1,000 ml) is added and the resulting dark brown solution is stirred and heated at a gentle reflux (97°-106° C.) for 19 hours. A precipitate forms and is redissolved by addition of 200 ml water. Reflux is continued and over the next 8 hours, 1,000 ml water is added in several portions to maintain solubility of the polymer. After a total of 27 hours at reflux, the polymer is precipitated by the addition of 1,000 ml concentrated hydrochlroic acid. The mixture is cooled to 18° C. and the thick polymeric gum isolated by decantation and dried under vacuum at 50°-75° C. with occasional pulverization for 40 hours to give 332 g of poly(vinylamine hydrochloride) as a brown granular solid (77% yield from vinylacetamide, 59% from acetaldehyde). Steps B and C are repeated and the products are pooled.

D. Conversion of Poly(vinylamine hydrochloride) to Sulfoamido Adduct.

12.5 Grams of the poly(vinylamine hydrochloride) of part C is added with 1.0 liters of water to a 12 liter stirred flask. The pH is raised from 2.5 to 10.0 by addition of 0.8 N NaOH. Then 350 ml of tetrahydrofuran is added to yield a solution of the free amine.

Next, 404 grams of N-acetylsulfanilyl chloride is added slowly, pH being controlled at 9.0-9.5 by NaOH addition. 1250 Ml of THF is added to maintain a solution. Additional NaOH is added to carry the pH to 10.5-11.0. THF is stripped off under vacuum. A precipitate forms and is collected and found to be the polymer

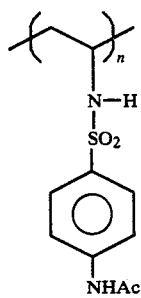

This reaction is repeated five times.

E. Hydrolysis

The individual products of the six runs of part D are hydrolyzed.

To a flask is added one of the reaction products, 2.9 liters of water, and 786 ml of concentrated hydrochloric acid. The acid is refluxed for six hours to yield a solution of the amine

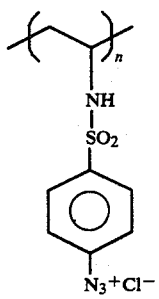

(This reaction is repeated with each product of part D.)

F. Diazotization and Coupling

One of the solutions of part E containing 1.6 equivalents of polymer is cooled to 20° C. 377 Ml of 5 N NaNO₂ is added with stirring. The mixture is stirred for 30 minutes. The solution is then transferred to a solution of 484 g (1.15 equivalents) of Schaeffer's salt in 4.5 liters of water and 12.8 equivalents of NaOH at a temperature of about 5°–10° C. (maintained by ice addition). This solution is stirred for 45–60 minutes. NaOH is added to pH 12. About 18 liters of crude reaction product containing about 4% w of the polymeric "Sunset Yellow" colored dye,

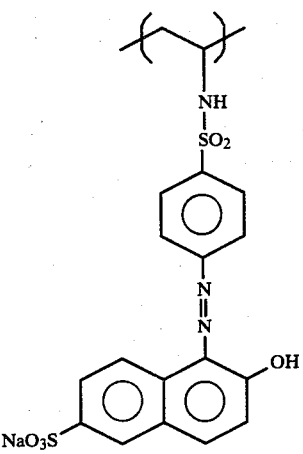

is obtained. This is repeated with each product of Part E. The coupled products contain in solution:

| | | |
|---|---|---|
| Polymeric colorant of Molecular wt above 1000 Daltons | 1.5–2 | % w, basis total solution |
| Organic impurities plus Polymeric colorant of molecular wt below 1000 Daltons, | 0.2–0.6 | % w, basis solution |
| | 15–30 | % w, basis polymeric colorant |
| Inorganic salts | 2–3 | % w, basis solution |
| | 100–150 | % w, basis polymeric colorant |

G. Ultrafiltration

Ultrafiltration is carried out in the apparatus described in Example I using an Amicon PM-30 anisotropic membrane having a 30,000 molecular weight cut off. First, experimental studies similar to those of Example I are conducted on one solution of part F. The solution is adjusted to pH 12.5 and filtered to remove solids and charged to the Romicon unit feed tank. The unit is run without makeup addition until the retentate volume is reduced to a level that the concentration of polymeric dye is about 3% by wt. Then the unit is run in a diafiltration mode. When deionized water is added as the makeup after as many as 22 diavolumes there are still >1% (basis colorant) of low molecular weight organic impurities present in the retentate. When this run is repeated, adding base (NaOH) to the make up water so that the pH is held above 12.0 but below 13.0, after 13 diavolumes of ultrafiltration, the product is free of organic impurities of molecular weight below 1000 Daltons as determined by gel permeation chromatography analysis.

The retentate is further filtered using water as makeup to remove residual inorganic salts and base, thus yielding a product which contains
 less than 1% by wt (basis total colorant) of organic impurities of molecular weight below 1000 Daltons. and
 about 1% by wt (basis total colorant) of salts—this last value could be easily reduced by further water diafiltration.

The ultrafiltration is repeated on the remaining products of Part F. Base addition to pH 12 is employed. The ultrafiltration inlet pressure is 100–105 psig. The temperature is 30°–45° C. It is observed that after 7 or 8 diavolumes (as opposed to over 22 diavolumes without base) the retentate is free (contains less than 1%) of low molecular weight impurities.

EXAMPLE III

A polymeric colorant of the formula

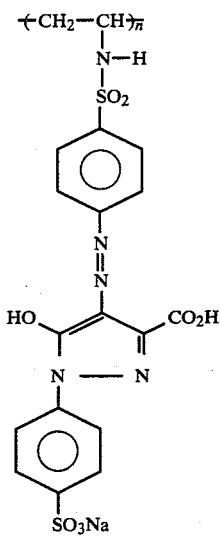

is prepared following the general methods of Example II. Eight preparations are carried out. The backbone of parts A, B, and C of Example II is employed. The conversion, hydrolysis and diazotization of parts D and E are used. In the coupling of part F, instead of Schaeffer's salt, a similar molar amount of Pyrazolone T,

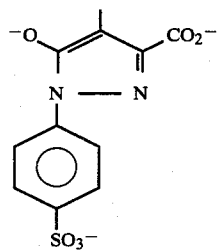

is used.

The crude reaction mixture is filtered to remove solids and charged to the ultrafiltration unit of Example 1 equipped with a PM-30 membrane. Water is removed to give a total volume of 10 liters. These concentrated crude products have the following composition (ranges reflect variation among the eight preparations).

| | |
|---|---|
| Polymeric colorant of molecular weight above 1000 Daltons | 2.5–3.6%, basis solution |
| Polymeric colorant of molecular weight below 1000 Daltons | *At least 0.6–0.9% basis solution |
| Colorant precursors and other organic impurities of molecular weight below 1000 Daltons | *At least 25% (basis colorant) |

*As determined by analysis for two specific low molecular weight impurities.

The products are then ultrafiltered in a diafiltration mode using pH 10–11 makeup (NaOH as base). After 2.5–3.0 diavolumes of ultrafiltration one impurity, pyrazolic acid, is absent, after 10 diavolumes, monomeric tartrazine impurity is below the detection limit (1%, basis colorant) of the analytical method. Following the diafiltration with added base, additional diafiltration is carried out with water makeup. This removes the added base, completes salt removal and yields a purified product.

Ultrafiltration inlet pressure is 100 psig. Temperature is 38°–50° C.

When the crude material is ultrafiltered without base addition, so that the pH decays to 7 it is observed that the removal of low molecular weight impurities drops in efficiency.

EXAMPLE IV

A. Preparation of Copolymer Backbone

To 2304 g of acetamide (technical) in a 12-liter reaction flask is added 62.2 ml of 6 M aqueous sulfuric acid followed immediately by 661 g of acetaldehyde (99+%). This mixture is stirred and heated until the internal temperature reaches 78° C. (11 minutes) at which point the clear solution spontaneously crystallizes, causing a temperature rise to 95° C. The reaction product, ethylidene-bis-acetamide, is not separated. Heating and stirring are continued for another 5 minutes to a temperature of 107° C. and a mixture of 150 g calcium carbonate (precipitated chalk) and 150 g of Celite$^R$ diatomaceous earth powder is added. A first distillate fraction of water and acetamide is removed. The remaining materials are cracked at 35 mm Hg and 185° C. A fraction made up of vinylacetamide and acetamide is taken overhead, analyzed by NMR and found to contain 720 g of vinylacetamide and 306 g of acetamide. A portion of this pooled material is dissolved in isopropanol, cooled, and filtered to yield a stock solution. This stock solution is analyzed and found to be 4.1 molar in vinylacetamide.

Into a five-liter flask is added 505 ml (272 g) of a vinylacetamide solution obtained by stripping isopropanol from 900 ml of the above stock solution (containing 3.69 mole of vinyl acetamide). AIBN (15 g) in 1500 ml of water is added followed by 1279 g of 25% w sodium vinyl sulfonate in water (Research Organic Corp.) and one liter of water. This is 2 equivalents of sulfonate per 3 equivalents of vinylacetamide. Following deoxygenation, the mixture is heated to 65° C. and there maintained with stirring for 3 hours. This reaction mixture is then reduced to ⅔volume solid. AIBN is removed and the liquid added to 8 gallons of isopropanol. The copolymer precipitate is collected and dried in vacuum to yield 865 g of solid copolymer (mol wt $16 \times 10^4$). Whenever an experimental molecular weight is given in this specification, it is derived by gel permeation techniques. In the primary technique, a silanized porous glass support is used with a 0.01 M LiBr in DMF eluant. Detection is by refractometer with standardization being based on suitable purchased poly(styrene or poly(styrenesulfonate) standards.

Into a two-liter flask is added 863 g of the just-noted solid product, 2.5 liters of water and one liter of concentrated hydrochloric acid. The mixture is refluxed (99°–110° C.) for about 24 hours, and cooled. The solid precipitate is washed, and dissolved in 3 liters of 10% NaOH. This reaction mixture is added to about twelve liters of methanol to give 400 g of fine solid precipitate.

B. Preparation of Chromophore

Into a 5-liter kettle is charged 750 g of 1-amino-2-methyl-4-bromo-anthraquinone (Sandoz AMBAX), 1550 g of ethylacetoacetate, 580 g of nitrobenzene, and 19.6 g of sodium acetate. The mixture is deoxygenated and heated to 150+ over about 4 hr. During the last 2.5 hr, 385 ml of distillate is collected. The product is cooled, collected on a filter and washed with acetone and water and dried to yield 830 g of the chromophore.

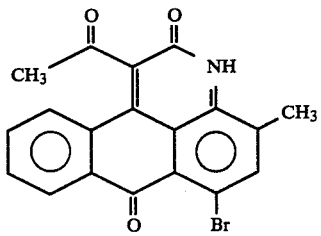

C. Attachment of Chromophore

300 Gram of the copolymer of Part A is dissolved in 4.2 liters of 1 N NaOH, and the mixture is heated to 90° C. Then 480 g of the chromophore of Part B and 20 g of $CuCl_2$ catalyst are added. The mixture is heated at 90°–101° C. for 3.5 hr, while an additional 4 liters of NaOH and an additional 20 g of catalyst are added. The mixture is cooled by adding 10.7 kg of ice. HCl, NaOH and acetic anhydride are added to buffer the solution at pH 10.

D. Ultrafiltration

Five gallons of the solution of part C is prefiltered three times with an 0.25 micron filter to remove solids. This material contains an estimated 412 g of polymeric anthrapyridone colorant of the formula:

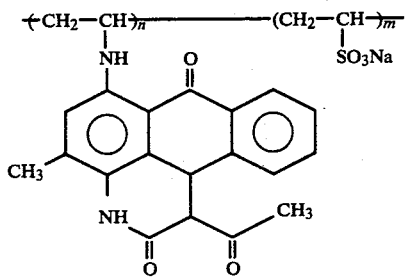

It also contains unreacted chromophore, chlorophore degradation products, salts, organic solvents and other impurities. To the filtered material is added 660 ml of 19.1 N NaOH and 2.2 liters of pyridine. (The addition of pyridine to an ultrafiltration mixture is itself a separate invention and is the subject of a copending patent application, docket).

This material is charged to an ultrafiltration unit similar to the device set forth in Example I. This unit, however, has two parallel filtration cells with a total membrane area of 47 sq ft. The membrane is PM-10.

The mixture is first concentrated to four gallons. Then ten diavolumes of diafiltration are carried out using the following makeup solvent: 10 gal $H_2O$, 1 gal pyridine, 800 ml of 19.1 N NaOH. This removes the colorant impurities. Then, 7 diavolumes of diafiltration are performed with a water makeup. Next the solution is brought to pH 7 with HCl and 5 additional diavolumes of water are passed to remove neutralization products.

The retentate is then passed over a 50 cm×1.2 cm diameter bed of 4.5 kg of macroporous strong acid ion exchange resin, AG MP50 from Bio-Rad Laboratories, to remove copper. The resin bed is rinsed with 3 liters of water. The rinse is added to the product.

The pH during the ultrafiltration is pH 12–12.5. When the ultrafiltration is repeated using deionized water or deionized water plus pyridine alone and the pH falls below about pH 9, the efficiency of the ultrafiltration falls to where after 10 diavolumes, substantial low molecular weight impurities remain. The resulting final product is dried and recovered as a dry solid. It has the following analysis:

| | | |
|---|---|---|
| | Water | 7.5% |
| | Insolubles | 0.02% |
| | Salt | 0.073% |
| | Monomers and materials less than 1000 mol wt | 0.24% |
| | Polymeric colorant with mol wt above 1000 | 92.2% |

EXAMPLE V

Preparation of a red colorant by attaching an anthrapyridone to poly(vinylamine) and thereafter solubilizing.

A. Preparation of Chromophore

To a flask is added one kg of 2-methyl-anthraquinone and about 5 liters of 96% $H_2SO_4$. The mixture is stirred until it is entirely homogeneous and then cooled to 0° C. The addition of 500 g of $KNO_3$ is then carried out in ten portions in such a way that the temperature does not rise above 5° C. This requires about two hours. A yellow product precipitates out after roughly half the $KNO_3$ has been added.

The yellow slurry is then stirred at 0° C. for 20 hr and poured into 30 gallons of ice/$H_2O$ with vigorous stirring. Stirring is stopped, the precipitate is allowed to settle, and the liquid is removed. The precipitate is washed with water until the pH of the wash water is pH 4–5.

An aqueous slurry of the precipitate is placed in a flask. One kg of $Na_2SO_3$ was added and the mixture is heated and stirred at 95° C. for three hours then filtered. The recovered solids 1-nitro-2-methylanthraquinone. are washed with boiling water and sucked dry.

The wet filter cake of 1-nitro-2-methylanthraquinone is combined with 4.2 kg of $Na_2S.9H_2O$ dissolved in 25 liter of $H_2O$ and the slurry is heated and then stirred at 95°–99° C. for 2 hr. The reaction mixture is filtered and the orangish-red solid 1-amino-2-methylanthraquinone product is washed with hot $H_2O$ until the filtrate is clear and dried in vacuo at 70° C.

200 g of 1-amino-2-methylanthraquinone of Part B and 3 filters of glacial acetic acid are combined. The mixture is heated to 35° C. and 170 g of bromine is added in one portion. After stirring for 20 hours at 35° C. an additional 34 g of $Br_2$ is added and the temperature is raised to 50° C. for 4 hr. The reaction mixture is cooled to room temperature and filtered. The solid product is recovered and washed with acetic acid and $H_2O$.

The wet filter cake is added to 10 liter of hot H₂O containing 500 g of NaHSO₃ and stirred for 30 minutes at this temperature. The red solid 1-amino-2-methyl-4-bromoanthraquinone is recovered, washed and dried.

With magnetic stirring, 63 g of the bromoanthraquinone prepared in Part C is treated with 400 g of diethyl malonate and one gram of Na₂CO₃ for two hours at 180°–190° C. Volatiles are removed with an argon stream. After cooling, the product is filtered and the residue is washed with alcohol, hot water, and alcohol again and stirred overnight with 100 ml of toluene. After filtration and drying, the yield is about 70 g of solid, 3'-carbethoxy-2-methyl-4-bromo-1,9-anthrapyridone, i.e.,

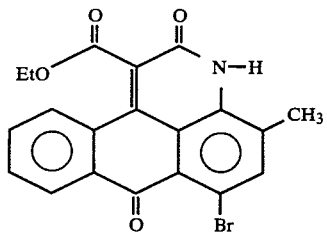

B. Preparation of a Supported Copper Material to be Used as a Coupling Catalyst A 330 g portion of cupric acetate monohydrate is heated to 90° C. with 27 liter of water. 3 Kg of 28.3% concentrated NH₄OH is added followed by 450 g of Aldrich dextrose and 300 g of Baker #345 Norite® brand activated carbon in about 3 liter of water. The black mixture is refluxed while 300 g of NaOH in 3 liters of water is gradually added over an hour period. The black solid which results is copper/copper oxide on carbon. It is isolated from the slurry by filtration and resuspended and filtered 3 times to yield about 700 g of final solid product.

C. Preparation of Polymeric Colorant

A flask is charged with 32 g of poly(vinylamine hydrochloride) prepared as in Example II. 170 g of Na₂CO₃ and 1.5 liter of H₂O. The mixture is stirred until a homogeneous solution results and 3 liters of ethylene glycol is added. Then 82 g of 3'-carbethoxy-2-methyl-4-bromoanthrapyridone prepared in Part A is added to the mixture along with 40 g of the copper/copper oxide on carbon catalyst prepared in Part B. The entire mixture is placed in a 110° C. oil bath and stirred vigorously. The coupling of the bromoanthrapyridone is over in 15–20 minutes.

The reaction mixture is filtered to remove solid residues. A clear solution of the red polymer dye in 2:1 ethylene

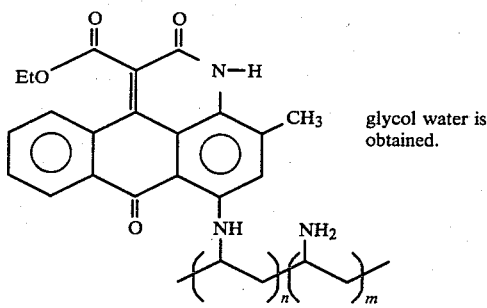

glycol water is obtained.

The glycol/water solution (pH 10.5) is treated with 500 g of trimethylamine-sulfur trioxide complex for 48 hours at room temperature. The pH is maintained at 10–11 by the addition of 2.5 N NaOH as necessary. The reaction mixture is then heated to 50° C. for 4 hours (pH maintained at 10.5). After cooling, the mixture is filtered and microfiltered through a Millipore® filter to remove solid impurities. This results in a crude reaction product containing: polymeric colorant of the formula.

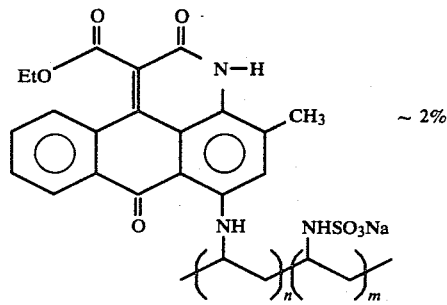

Polymer backbone and chromophore residues and polymeric colorant

| | |
|---|---|
| below 1000 Daltons molecular weight | ~ 2% w |
| Ethylene glycol | 30–33% w |
| Salts | ~ 4% w |
| Trimethylamine - SO₃ residues | ~ 8% w |

D. Ultrafiltration

The crude reaction product is ultrafiltered using the apparatus and membrane and conditions of Example IV. First, five diavolumes are passed using pH 9 water as makeup. This removes over 90% of the glycol in the feed. Then the makeup is changed to a pH 11.5–12.0 water. This causes impurities to be removed. When 5% pyridine is added, the removal of impurities increases such that after ten diavolumes a product results containing less than 0.5% by weight (basis colorant) of organic impurities of molecular weight below 1000. Residual base is neutralized and removed with pyridine using ultrafiltration and water makeup. The purified retentate is passed over an ion exchange bed also as shown in Example IV to remove residual copper catalyst.

The catalyst-free purified solution is spray-dried. This results in a solid purified product containing:

| | | |
|---|---|---|
| about | 0.3% | monomers and organic materials |
| below | 1000 | molecular weight |
| about | 0.1% | salts |
| about | 0.01% | insolubles |
| about | 6–10% | water |
| about | 90–94% | (by difference) polymeric colorant. |

If this ultrafiltration is attempted without base addition (with or without pyridine), the removal of low molecular weight organic impurities is poor. There is evidence of gelling formation in the ultrafiltration unit if substantial salt is present and very poor passage of impurities such that after 20–30 diavolumes there is still greater than 1% of organic impurities in the polymeric dye product.

EXAMPLE VI

The purifications of Examples II and IV are each repeated several times varying the base addition step. When KOH is substituted for NaOH, equivalent results are obtained. When NH4OH is substituted (pH 12.0) equivalent results are obtained.

When the maintained pH is varied from 12-13 to 11-12 to 10-11 to 9-10 it is observed that the more basic pH's yield the most efficient separations, but that even maintaining the pH at 9-10 results in higher efficiency separations than merely using deionized water (pH 7) as makeup.

What is claimed is:

1. In the process for purifying a solution of a polymeric colorant wherein an aqueous feed solution comprising polymeric colorant of molecular weight above 1000 Daltons polymeric colorant and polymeric colorant precursors and degradation products and inorganic salts of molecular weight below 1000 Daltons is brought in contact with a semipermeable membrane under ultrafiltration conditions in a diafiltration mode for a plurality of diavolumes thereby forming an ultrafiltrate comprising polymeric colorant, polymeric colorant precursors and degradation products and inorganic salts of molecular weight below 1000 Daltons and a retentate comprising polymeric colorant of molecular weight above 1000 Daltons, the improvement which comprises maintaining the pH of the feed solution above pH 9.0 for at least 2 diavolumes by addition of base directly to said ultrafiltration feed, said ultrafiltration feed comprising at least 50% by weight water, and said base being only an alkali metal or alkaline earth metal inorganic base.

2. The process of claim 1, wherein the pH of the feed solution is maintained in the range of from pH 10 to pH 13.

3. The process of claim 1, wherein the pH of the feed solution is maintained in the range of from pH 11.0 to pH 13.0 for from 3 to 20 diavolumes.

4. The process of claim 3 wherein the base is selected from the group consisting of NH4OH and the alkali metal hydroxides.

5. The process of claim 4 wherein the polymeric colorant is a polymeric azo colorant.

6. The process of claim 4 wherein the polymeric colorant is a polymeric anthraquinone colorant.

7. The process of claim 4 wherein the semipermeable membrane is a asymmetric semipermeable ultrafiltration membrane.

8. The process for purifying a solution of a polymeric colorant which comprises: (A) Contacting an at least 50% by weight water aqueous feed solution comprising aqueous solvent, from 0.1 to 40% by weight basis total solution of dissolved polymeric colorant of molecular weight above 1000 Daltons, from 0.04 to 10% by weight basis total solution of dissolved organic materials of molecular weight below 1000 Daltons said materials including salts, polymeric colorants of molecular weight below 1000 Daltons and polymeric colorant precursors and degradation products with a semipermeable membrane at an inlet pressure of from 25 to 200 psig, and a temperature of from 10° C. to 100° C. and a feed pH of from 9.0 to 13, thereby forming an ultrafiltrate solution rich in materials of molecular weight below 1000 Daltons, and a retentate solution rich in polymeric colorant of molecular weight above 1000 Daltons; (B) Adding directly to said retentate aqueous solvent and base in an amount to maintain the water content at at least 50% by weight and its pH within the range of 9.0 to 13, and form a pH-adjusted retentate, said base being only an alkali metal or alkaline earth metal inorganic base; (C) Repeating the contacting of Step (A) using as feed the pH-adjusted retentate thereby forming a second ultrafiltrate and a second retentate; and (D) Recovering as said second retentate, a purified solution of polymeric colorant.

9. The process of claim 8, wherein in Step A base is present in an amount necessary to yield a solution pH of from 11 to 13 and wherein in Step B base is added in an amount necessary to maintain the pH at from 11 to 13.

10. The process of claim 9 wherein steps A, B and C are repeated sequentially from 2 to 10 times.

11. The process of claim 10 wherein said aqueous solvent is water.

12. The process of claim 11 wherein the aqueous solvent contains 1 to 4% added salt.

13. The process of claim 10 wherein the aqueous solvent contains 1 to 4% added salt.

14. The process of claim 10 wherein the feed solution comprises:

| | |
|---|---|
| polymeric anthraquinone colorant of molecular weight above 1000 Daltons | 0.5-8% wt basis solution |
| polymeric anthraquinone colorant of molecular weight below 1000 Daltons and polymeric colorant precursors and degradation products, of molecular weight below 1000 Daltons | 0.5 to 8% wt basis solution |
| inorganic base | sufficient to impart a pH of 11 to 13 to the solution. |

15. The process of claim 14 wherein the polymeric colorant comprises a copolymer of vinylamine and vinylsulfonate to which through its amine groups is covalently attached anthraquinone chromophores.

16. The process of claim 15 wherein the anthraquinone is an anthrapyridone.

17. The process of claim 10 wherein the polymeric colorant is an azo colorant.

18. The process of claim 4, wherein the base is selected from the group consisting of KOH, NaOH, Ca(OH)2 and NH4OH.

* * * * *